P. N. JONES.
BRAKING MECHANISM.
APPLICATION FILED JULY 17, 1908.
914,284.
Patented Mar. 2, 1909.
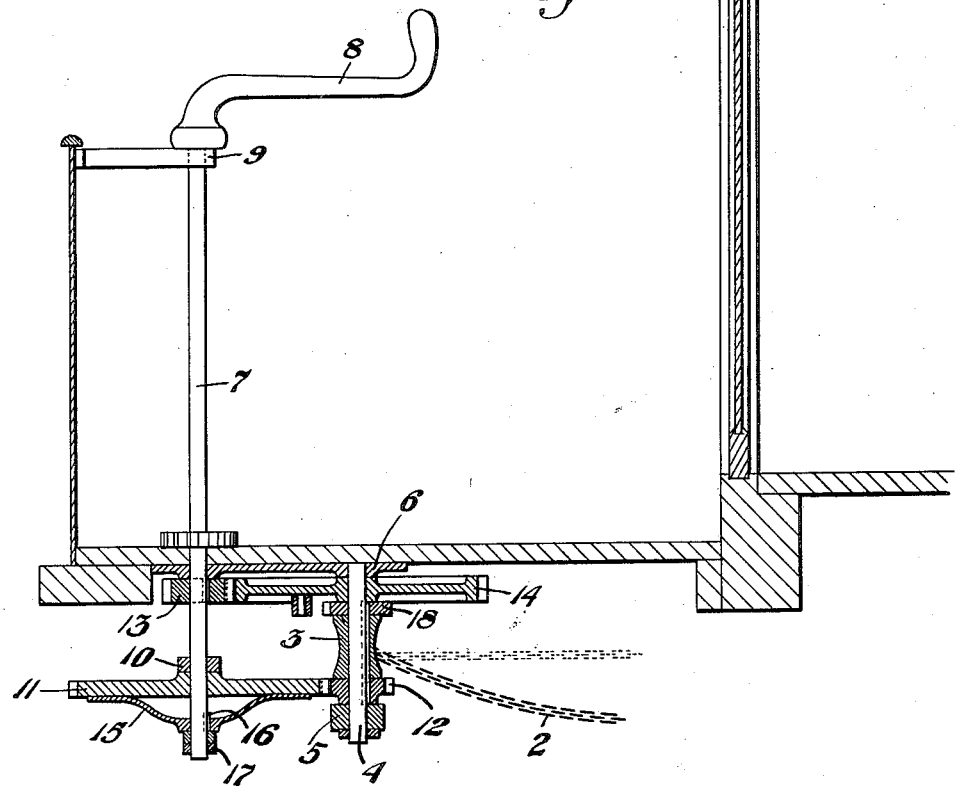
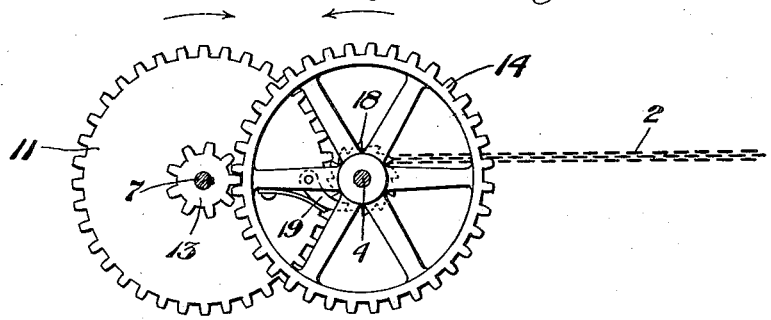
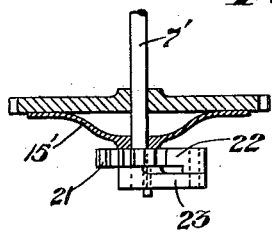
Witnesses:
Chas. S. Pepley.
Henry Sens.
Inventor.
Pearl N. Jones
By O. M. Clarke
his Attorney

UNITED STATES PATENT OFFICE.

PEARL N. JONES, OF PITTSBURG, PENNSYLVANIA.

BRAKING MECHANISM.

No. 914,284.     Specification of Letters Patent.     Patented March 2, 1909.

Application filed July 17, 1908. Serial No. 444,003.

*To all whom it may concern:*

Be it known that I, PEARL N. JONES, a citizen of the United States, residing at Pittsburg, in the county of Allegheny and State of Pennsylvania, have invented certain new and useful Improvements in Braking Mechanism, of which the following is a specification, reference being had therein to the accompanying drawing.

My invention refers to improvements in braking apparatus and is particularly designed for use as a hand-actuated brake for street cars, etc.

The object of the invention is to provide means for quickly taking up the slack of the brake chain through one set of gears of a given ratio until the chain is taut and then applying the braking power through another train of gears of a different ratio whereby the power is greatly increased, so as to accomplish the braking operation in the shortest time with a minimum travel of the brake lever and an application of increased leverage at the time required to forcibly apply the brakes. One of the preferred forms of the invention, for automatic change of gear service to accomplish these objects, is illustrated in the accompanying drawings, in which:—

Figure 1 is a view in sectional elevation of the end of a car and platform provided with my improvement. Fig. 2 is a plan view of the gearing. Fig. 3 is a sectional detail view showing a modification.

2 represents the brake chain connected with the brake beam of the usual construction or with any suitable mechanism for applying pressure through the brake shoes, not shown, said chain being attached to and winding upon a spool or sheave 3 mounted on vertical shaft 4 in suitable bearings 5, 6, incorporated with the car frame. 7 is the usual brake staff provided with the lever handle 8, also mounted at the front portion of the platform in suitable bearings 9 above and 10 below the floor.

The invention employs two sets or trains of gears, preferably consisting of two intermeshing toothed wheels for each, although an additional number may be employed if desired, to reduce or increase the leverage and resulting speed of operation, two wheels for each train however, being all that will ordinarily be required. One set of said wheels as 11, 12, are of such a ratio to each other as to secure a rapid rotation of the spool 3 and resulting rapid winding of the chain for taking up the slack in the chain and rigging without the necessity of much power, while the other set consisting of the wheels 13, 14, are in reverse proportion to produce greatly increased leverage in the driving wheel and correspondingly reduced speed and increased power in the driven wheel 14 and spool 3, to wind the chain thereon after contact is made by the brake shoes, whereby to apply final effective braking power through said gears.

In order to accomplish the comparatively rapid rotation of the spool through driving gear 11 and driven gear 12 up to a reasonable limit, gear 11 is loosely mounted on staff or shaft 7, and preferably against the bearing 10, while driving connection between the shaft and the gear is provided by means of any suitable friction mechanism as a spring disk 15 fixedly secured to shaft 7, as by key or spline 16 and one or more retaining nuts 17. By these means, the friction disk 15 is rotatably connected with the shaft 7 and its pressure may be adjusted against the side face of gear 11 to the desired degree. Gear 12 is keyed or otherwise positively secured to shaft 4 and will continue to rotate the shaft and its spool 3 for as long as shaft 7 is rotated, rapidly winding the chain 2 upon the spool to take up the slack until the strain will oppose resistance through gear 12 and gear 11 to the frictional contact of disk 15, resulting in slippage. Thereupon gear 13, which is fixedly keyed or otherwise secured to shaft 7, and which heretofore has rotated gear 14 idly (due to the more rapid travel of shaft 4 and the intervening ratchet mechanism hereinafter described), will, by its meshing engagement with gear 14, cause said gear to rotate actively in continuation of its previous inactive rotation, it being understood that shaft 4 has ceased to receive any rotation through gears 11 and 12, due to slippage of disk 15. To accomplish this operation, I employ a ratchet wheel 18, keyed or otherwise fixedly secured to shaft 4, with which ratchet engages a pawl 19, preferably spring-pressed into engagement with the teeth on gear 14 as shown.

In the initial comparatively rapid rotation of spool 3 and ratchet wheel 18 in the direction of the arrow *a* Fig. 2, the ratchet teeth will pass the pawl 19 mounted on the comparatively slower idly-moving gear 14, but upon the cessation of rotation of shaft 4 through gears 11, 12, (due to the slippage of friction disk 15,) and the application of power through gears 13, 14, pawl 19 and ratchet wheel 18, said shaft 4 will thereupon be rotated at a comparatively slow rate of speed with a correspondingly increased power due to the difference in leverage, resulting in the further winding of the chain and the application of the brakes until they have been applied to the desired extent.

Loosening of the brakes is accomplished by merely releasing the lever 8, allowing the tension of the chain to reverse the movement until it is sufficiently slackened, although the shaft 7 may be positively reversed if desired against the friction of disk 15 to provide sufficient slacking. Preferably however, the spring 15 should be connected with staff 7 by ratchet mechanism of well known construction, thus allowing for easy reversal, and making the frictional engagement operative in one direction only. Such construction is shown in Fig. 3 in which the friction disk 15' and ratchet 21 are loosely mounted on the brake staff 7' while a spring-pressed pawl 22 and its carrier 23 are secured to the staff 7' as shown. By this construction it will be seen that the staff may be readily reversed without imparting movement to the friction disk.

Instead of the friction mechanism 15, other means may be employed for engagement with and disengagement from the initial train of gears for quick winding and the second train of gears 13, 14, for slow winding, as by means of any suitable locking device adapted to throw one or the other of the driving gears into engagement with the hand-operated actuating staff, and electric mechanism may also be employed whereby magnets may be utilized to actuate said interlocking mechanism, controlled by ordinary press buttons or switches of any suitable design.

Other changes or variations may be made by the skilled mechanic in the construction, design or details of the invention and it may be employed with various other forms of mechanism, but all such changes or variations are to be considered as within the scope of the following claims:

What I claim is:—

1. Means for applying variable braking power consisting of a tightening element, an actuating element, two sets of interposed gearing of different ratios, a gear of each set being loosely mounted on the tightening element and on the actuating element respectively, and means whereby each set actuates the tightening element in proportion to the strain.

2. Means for applying variable braking power consisting of a tightening element, an actuating element, two sets of interposed gearing of different ratios, a gear of each set being loosely mounted on the tightening element and on the actuating element respectively, and means controlled by the strain of the tightening element whereby one set actuates the tightening element at high speed under reduced tension and the other set actuates it at low speed when the tension is increased.

3. Means for applying variable braking power consisting of a tightening element, an actuating element, two sets of interposed gearing of different ratios, a gear of each set being loosely mounted on the tightening element and on the actuating element respectively, and means including automatic friction-controlled connecting and disconnecting mechanism for actuating the tightening element in proportion to the ratios of the gearing.

4. In braking mechanism, the combination of a tightening element and its shaft provided with a fixedly mounted and a loosely mounted gear of varying diameters, an actuating element provided with a fixedly mounted and a loosely mounted gear of varying diameters meshing therewith, and means incorporated with each element for operative connection with one of its gears dependent on the tension exerted on the tightening element.

5. In braking mechanism, the combination of a winding spool and its shaft, a driven gear secured to the shaft, a relatively larger gear and ratchet mechanism connecting it with said shaft, an actuating shaft provided with a fixed driving gear intermeshing with said ratchet-controlled gear, and a relatively larger gear mounted on the actuating shaft for slippage and meshing with the first named gear secured to the winding spool shaft, substantially as set forth.

6. In braking mechanism, the combination of a winding spool and its shaft, a driven gear secured to the shaft, a relatively larger gear and ratchet mechanism connecting it with said shaft, an actuating shaft provided with a fixed driving gear intermeshing with said ratchet-controlled gear, a relatively larger gear loosely mounted on the actuating shaft and meshing in the first named gear secured to the winding spool shaft, and a friction device secured to the actuating shaft and engaging said loosely mounted gear, substantially as set forth.

7. In braking mechanism, the combination of a shaft provided with a fixedly attached winding spool and gear and a relatively larger loosely mounted gear, pawl and ratchet mechanism adapted to connect the winding spool and its shaft with said gear, a brake staff having a fixedly attached gear engaging the loosely mounted gear of the winding-spool shaft, a relatively larger gear loosely mounted on the brake staff and engaging the fixedly attached gear of the winding spool shaft, and a friction device secured to the staff and engaging said gear, substantially as set forth.

8. In braking mechanism, the combination of a shaft provided with a fixedly attached winding spool and gear and a relatively larger loosely mounted gear, pawl and ratchet mechanism adapted to connect the winding spool and its shaft with said gear, a brake staff having a fixedly attached gear engaging the loosely mounted gear of the winding-spool shaft, a relatively larger gear loosely mounted on the brake staff and engaging the fixedly attached gear of the winding-spool shaft, and a friction device secured to the staff and engaging the said gear, with supporting frames for said parts, substantially as set forth.

9. In braking mechanism, the combination of a winding spool and its shaft, a driven gear secured to the shaft, a relatively larger gear and ratchet mechanism connecting it with said shaft, an actuating shaft provided with a fixed driving gear intermeshing with said ratchet-controlled gear, a relatively larger gear loosely mounted on the actuating shaft and meshing in the first named gear secured to the winding spool shaft, a friction device loosely mounted on the actuating shaft, and ratchet and pawl mechanism for imparting movement from said shaft to the friction device, substantially as set forth.

In testimony whereof I affix my signature in presence of two witnesses.

PEARL N JONES.

Witnesses:
C. M. CLARKE,
CHAS. S. LEPLEY.